May 29, 1956     H. W. HEMPEL     2,747,868
DIAL CONTROL SYSTEM FOR ELECTRICALLY ACTUATED AND
CONTROLLED TAPE MEASURING AND DISPENSING MACHINES
Original Filed Sept. 12, 1949     3 Sheets-Sheet 1
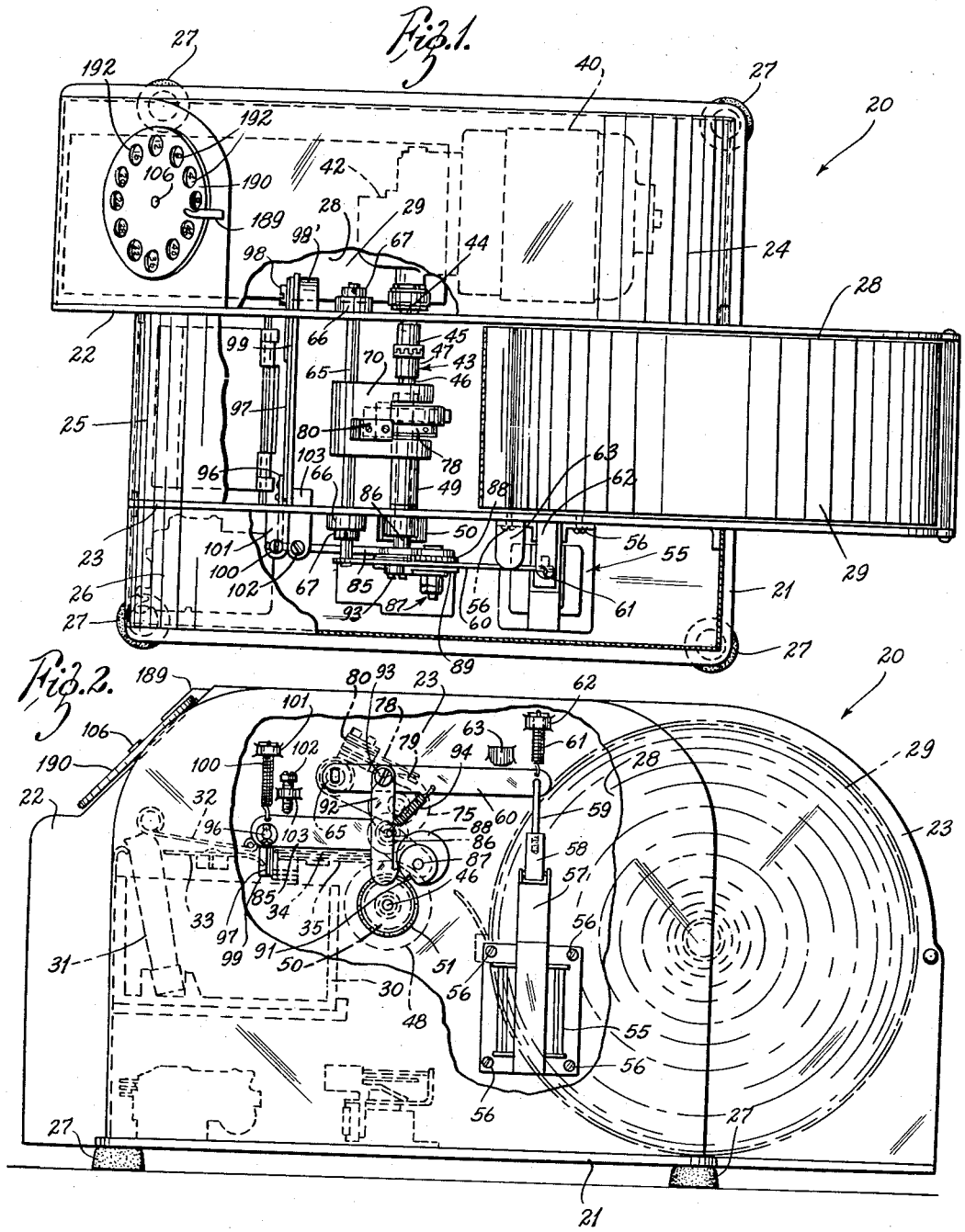
INVENTOR:
HERBERT W. HEMPEL,
By Kingsland, Rogers & Ezell
ATTORNEYS.

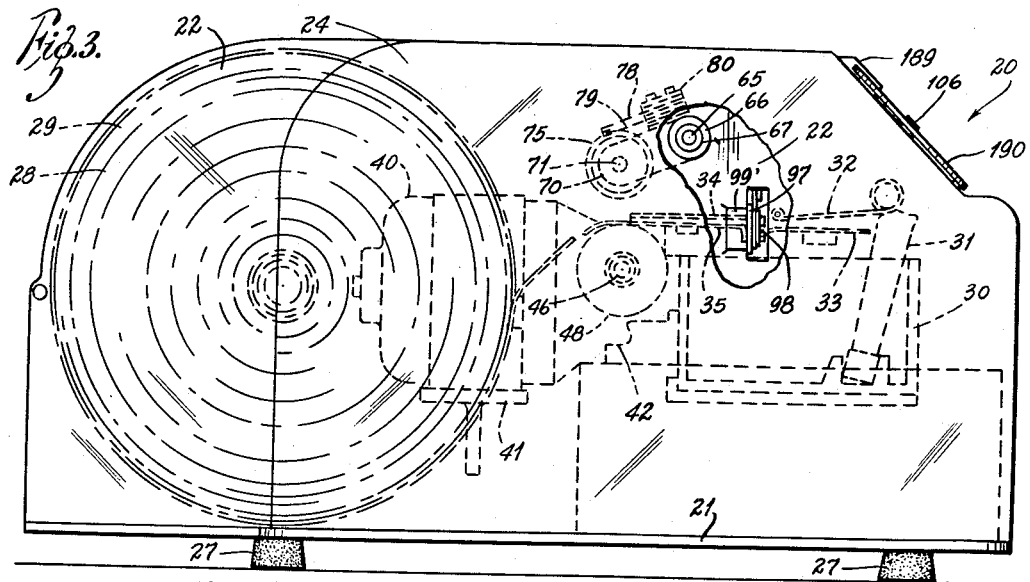
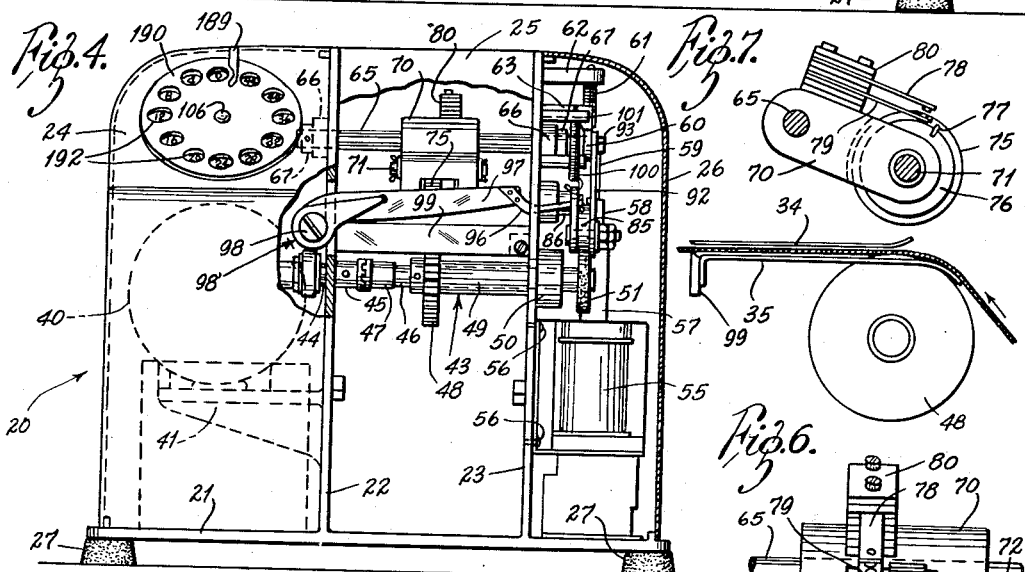
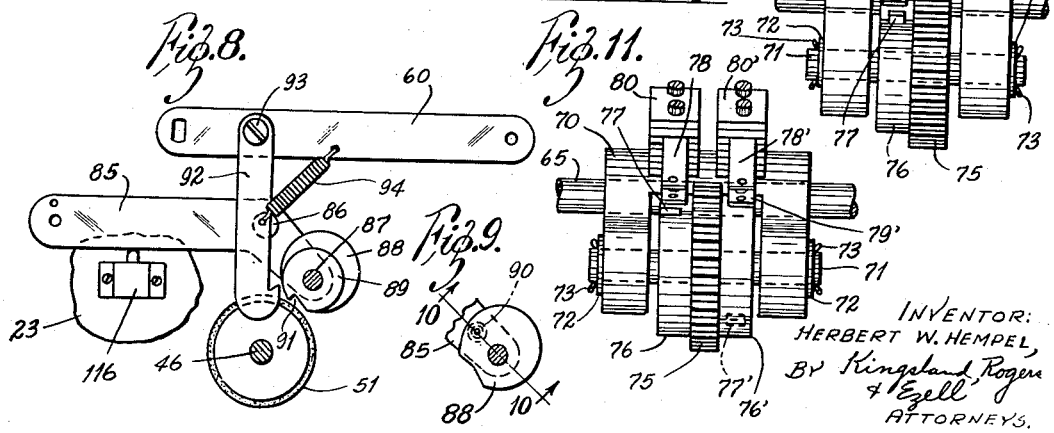

May 29, 1956 H. W. HEMPEL 2,747,868
DIAL CONTROL SYSTEM FOR ELECTRICALLY ACTUATED AND
CONTROLLED TAPE MEASURING AND DISPENSING MACHINES
Original Filed Sept. 12, 1949 3 Sheets-Sheet 3
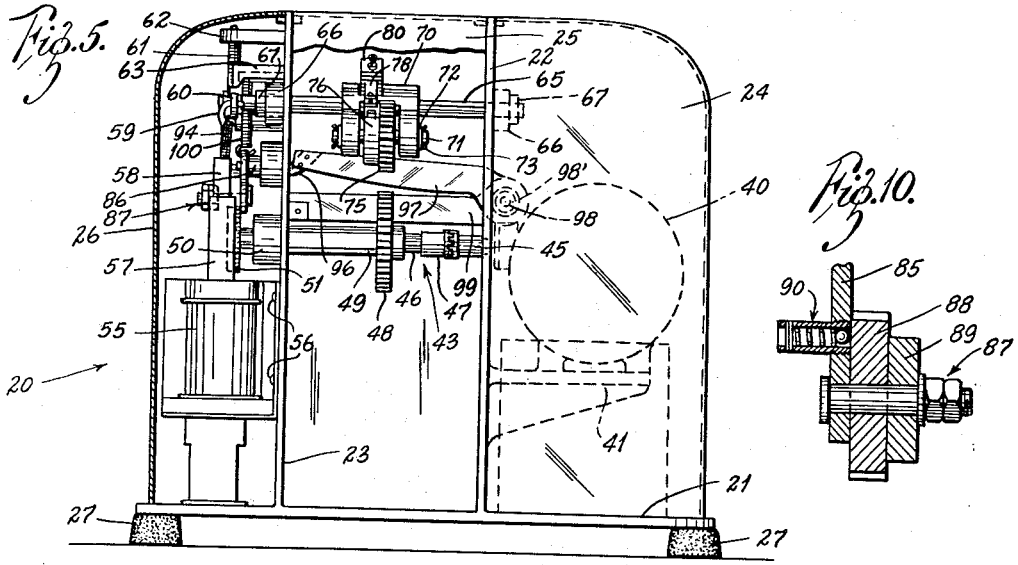
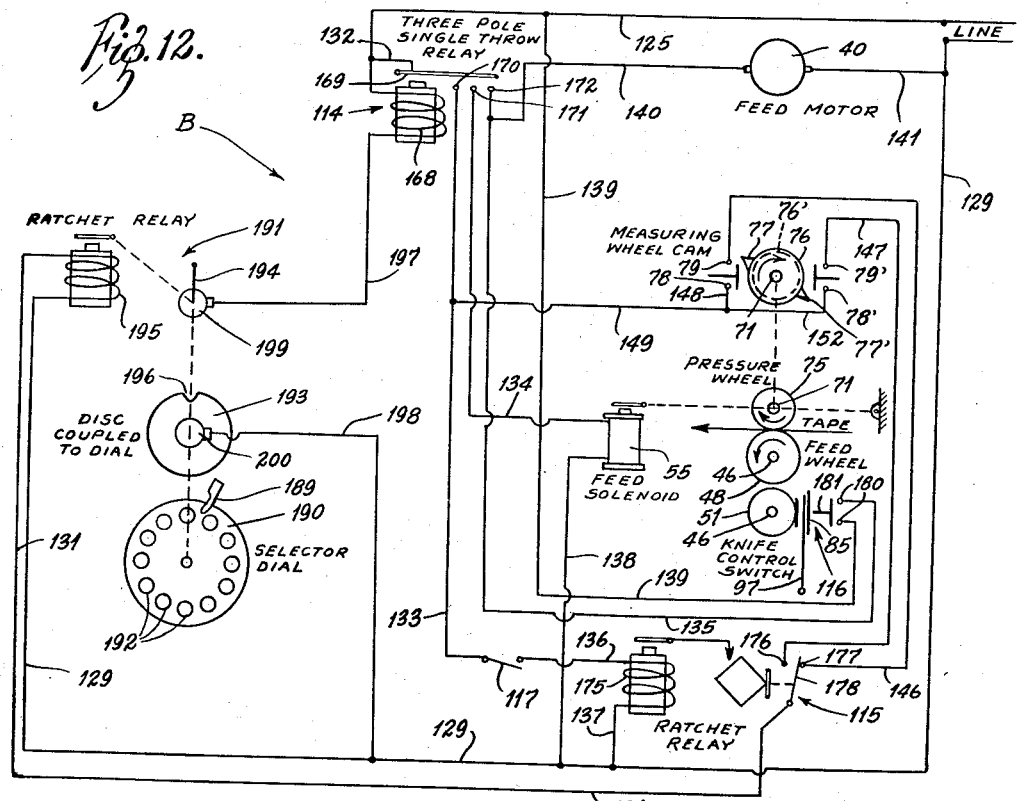
INVENTOR:
HERBERT W. HEMPEL
BY Kingsland, Rogers & Ezell
ATTORNEYS.

United States Patent Office 2,747,868
Patented May 29, 1956

2,747,868

DIAL CONTROL SYSTEM FOR ELECTRICALLY ACTUATED AND CONTROLLED TAPE MEASURING AND DISPENSING MACHINES

Herbert W. Hempel, Belleville, Ill., assignor to Marsh Stencil Machine Company, Belleville, Ill., a corporation of Illinois Original application September 12, 1949, Serial No. 115,238. Divided and this application December 12, 1951, Serial No. 261,204

12 Claims. (Cl. 271—2.4)

The present invention relates generally to machines for dispensing gummed tape used for packaging purposes, and more particularly to a novel dial control system for electrically actuated and controlled tape measuring and dispensing machines.

The subject matter of the present invention was originally disclosed in applicant's copending application Serial No. 115,238, filed September 12, 1949, from which the present application has been divided. Briefly, the present invention comprises an electrically actuated and controlled gummed tape measuring and dispensing machine which includes a novel electrical control system adapted to receive a manual indication of the length of tape to be measured and dispensed and, without further attention from the operator, to effect delivery of the desired strip of tape. A rotatable finger dial, similar in appearance to the well-known telephone dial, is provided for selective manual indication of the length of tape desired.

An object of the present invention is to provide a novel electrical control system adapted to effect automatic operation of a tape measuring and dispensing machine upon manual indication of a desired length of tape to be dispensed.

Another object is to provide a novel electrical control system for tape measuring and dispensing machines which effects automatic completion of a tape measuring and dispensing cycle once it is initiated, and which permits neither overlapping operations nor unintended repeats.

Another object is to provide a novel electrical control system for tape measuring and dispensing machines in which a desired tape increment is indicated and the machine energized through a dial.

The foregoing and other objects and advantages are apparent from the following description taken with the accompanying drawings, in which:

Fig. 1 is a plan view of an electrically actuated and controlled tape measuring and dispensing machine constructed in accordance with the teachings of the present invention, portions of the cover being broken away for purposes of illustrating interior details;

Fig. 2 is a right side elevational view thereof, a portion of the cover being broken away to illustrate the interior mechanism;

Fig. 3 is a left side elevational view thereof, a part of the cover being broken away to illustrate interior details;

Fig. 4 is a front elevational view thereof, portions of the cover being broken away for purposes of illustrating interior details;

Fig. 5 is a rear elevational view thereof, portions of the cover being broken away to illustrate interior details;

Fig. 6 is a fragmentary enlarged view illustrating the pressure wheel for engaging the upper surface of the tape, together with its supporting yoke and other details;

Fig. 7 is an enlarged fragmentary vertical cross-sectional view illustrating the idle or non-feed relationship of the power driven tape feed wheel and the tape pressure wheel, together with other details;

Fig. 8 is an enlarged fragmentary vertical cross-sectional view illustrating the knife pivoting bell crank and associated elements;

Fig. 9 is an enlarged fragmentary vertical cross-sectional view illustrating one of the elements of the cut-off knife actuating mechanism;

Fig. 10 is a further enlarged cross-sectional view on substantially the line 10—10 of Fig. 9;

Fig. 11 is a view similar to Fig. 6, illustrating a modified construction; and

Fig. 12 is a wiring diagram of the control system for actuating the present machine.

Referring to the drawings more particularly by reference numerals, 20 indicates generally an electrically actuated and controlled tape measuring and dispensing machine incorporating the concepts of the present invention. The electric control system shown in Fig. 12 and generally indicated by the letter B is shown incorporated in the machine 20 illustrated in Figs. 1 through 11, although all wiring is omitted in order to clearly present the working parts, the wiring connections being fully disclosed in Fig. 12 which is clearly described below.

The machine 20 includes a base plate 21 and integral, interior parallel vertical walls 22 and 23. Cover elements 24, 25 and 26 are provided for shielding the working mechanisms of the machine 20 which are removably secured in place by any desired means. Rubber feet 27 are secured to and support the base 21. The walls 22 and 23 define in the rear portions thereof a tape roll receptacle 28 in which is shown disposed a tape roll 29. Forwardly of the receptacle 28 and spaced therefrom is a water reservoir 30 within which is removably disposed a tape moistening brush 31. The usual tape guide defining plates 32 and 33 are provided for directing the tape toward and across the top of the brush 31. Rearwardly of the plates 32 and 33 are tape guide defining plates 34 and 35 (Fig. 7). The foregoing elements, in one form or another, are found in tape measuring and dispensing machines.

An electric motor 40 is supported outwardly of the wall 22 upon a bracket 41 welded or otherwise secured to the wall 22. A suitable reduction gear unit 42 is associated with the motor 40 in operative relation with the usual driven shaft thereof.

A composite feed shaft 43 is rotatably supported by and between the walls 22 and 23. The composite shaft 43 includes a stub shaft 44 rotatably mounted in the wall 22, one end of which is operatively connected with the reduction gear unit 42, and the other end of which supports a clutch element 45 secured thereto by a suitable setscrew. Coaxial with the stub shaft 44 is a major shaft element 46 to one end of which is secured by a suitable setscrew a clutch element 47 which engages the aforesaid clutch element 45. A tape feed wheel 48 is secured to the major shaft element 46 by a suitable setscrew, the periphery of the feed wheel 48 being serrated for feeding purposes. A sleeve 49 surrounding the major shaft element 46 spaces the feed wheel 48 from the wall 23. The other end of the major shaft element 46 has bearing support in a bearing 50 secured to the outer surface of the wall 23. A friction drive wheel 51 is secured to the reduced free end of the major shaft element 46, the periphery of which is preferably covered with vulcanized rubber, the purpose and function of the friction drive wheel 51 being set forth below.

A suitable solenoid 55 is mounted on the outer face of the wall 23 by suitable screws 56 in a position substantially opposite that of the motor 40 (Fig. 2). The solenoid 55 includes a plunger member 57 to the upper end of which is pivotally connected a block 58. An inverted J member 59 threadedly engages the upper end of the block member 58, thus being adjustable vertically, and at its hook end pivotally engages the free end of a pivotally mounted link 60. A tension spring 61 has one end secured to a boss 62 welded or otherwise secured to the outer face of the wall 23, and its other end pivotally connected to the link 60 above and adjacent to the pivotal connection of the J member 59, thus biasing the link 60 counterclockwise. A stop boss 63 extends outwardly from the outer face of the wall 23 for engagement by the link 60 to limit its extreme counterclockwise position of movement. The spring 61 maintains the link 60 against the stop 63 and the plunger 57 of the solenoid 55 withdrawn, as is clearly shown in Fig. 2, when the solenoid 55 is deenergized. The link 60 is secured at its other end to one free end of a rotatable shaft 65 which extends between and through the walls 22 and 23 and is supported in bearings 66.

The rotatable shaft 65 is maintained against removal from the bearing 66 by collars 67. A yoke 70 is keyed or otherwise secured to the rotatable shaft 65 and has its legs extending downwardly and rearwardly therefrom, as is clear from Figs. 1 and 2. The legs of the yoke 70 support for free rotation a shaft 71 which is maintained against accidental removal by washers 72 and cotter pins 73 (Figs. 1, 6 and 7). A tape pressure wheel 75 having a serrated periphery is rotatably mounted on the shaft 71 between the legs of the yoke 70 (Fig. 6). A cam 76 in the form of a disc having a peripheral projection 77 of non-conducting material such as micarta, is secured to the pressure wheel 75 for rotation therewith. The pressure wheel 75 and the cam 76 may be keyed or otherwise secured to the shaft 71. Normally open resilient switch blades 78 and 79, each supporting a contact, are mounted on the base of the yoke member 70 through a laminated insulation block 80 and extend into position adjacent the periphery of the cam 76, and are adapted to be moved into closed circuit making position upon engagement of the switch blade 79 by the cam projection 77, which occurs once for each revolution of the pressure wheel 75. The effect of the engagement of the switch blades 78 and 79 is more particularly described below in conjunction with the description of the controlling system B.

An alternate tape pressure wheel construction is shown in Fig. 11 and is incorporated in the wiring diagram of Fig. 12. A second cam 76' is provided which is also secured to the pressure wheel 75, and which has a peripheral projection 77'. Normally open resilient switch blades 78' and 79', each supporting a contact, are mounted on the base of the yoke member 70 through a laminated insulation block 80' and extend into position adjacent the periphery of the cam 76', and are adapted to be moved into closed circuit making position upon engagement of the switch blade 79' by the cam projection 77', which occurs once for each revolution of the pressure wheel 75. The projection 77' is spaced one hundred and eighty degrees from the projection 77 for a purpose described below.

A bell crank lever 85 is pivotally mounted beneath the forward portion of the link 60 upon a stub shaft 86 extending outwardly from the outer face of the wall 23, as is clearly illustrated by Figs. 2, 4 and 8. On the free end of the rear arm of the bell crank lever 85 are mounted, for pivotal movement on a nut and bolt assembly 87, a roller 88 having a knurled periphery and a cam 89 (Fig. 10). For stopping the roller 88 in a selected position, there is provided a spring loaded ball detent unit 90 which is mounted in the rear arm of the bell crank lever 85 for engagement of the spring loaded ball thereof with a suitable indentation in the surface of the roller 88. As is clear from Figs. 8 and 9, the roller 88 is mounted off center on the nut and bolt assembly 87 and is cut away at one side. The cam 89 includes a shouldered notch 91 which is engageable by the hook end of a pawl 92 pivotally connected by a screw 93 to the link 60. A tension spring 94, secured to the link 60 and to the pawl 92 as shown in Fig. 8, biases the pawl 92 into engagement with the periphery of the cam 89. The forward end of the bell crank lever 85 pivotally receives in a suitable aperture the free end of an extension member 96 which is secured to the free end of a tape severing pivotally mounted knife blade 97 (Figs. 1, 2 and 4). The knife blade 97 is pivotally mounted at 98 upon a boss 98' welded or otherwise secured to the outer face of the wall 22. The movable knife blade 97 cooperates with a fixed blade 99 secured to and between the walls 22 and 23. A tension spring 100 biases the movable knife blade 97 into the open position shown in Fig. 4 against an adjustable stop 102 threadedly mounted in a boss 103 extending from the wall 23, said spring 100 having its upper end secured to a boss 101 welded or otherwise secured to the outer face of the wall 23 and its lower end engaging a suitable opening at the outer end of the forward arm of the bell crank lever 85.

Referring to Fig. 12, there is shown diagrammatically the above-mentioned electrical control system B. The control system B includes a telephone type selector dial 190, which, as shown in Fig. 1, is conveniently mounted exteriorly of the cover element 24 on a suitable shaft 106. The dial 190 includes a selected number of finger openings 192, twelve being shown by way of illustration. When the dial 190 is at rest, a predetermined number is exposed through each opening 192, said numbers being located upon a suitable fixed disc or the like disposed behind the dial 190, the numbers 0, 4, 8, 12, etc., through 42 being shown, the numbers indicating inches of tape to be dispensed. A finger stop 189 is secured to the cover element 24 to serve as a measuring index. The selector dial 190 is not of the spring return type, but remains in the position to which it is advanced in the selection of the length of tape to be measured and dispensed by the machine 20.

The selector dial 190 is mechanically coupled to, but insulated from, a conductive disc 193 by means of a suitable shaft. A conductive wiper arm 194 is mounted for rotation on a contact post 199 adjacent one side of the disc 193 and on a common axis therewith for engagement adjacent the periphery and for movement into a circuit breaking notch 196 in the disc 193 for breaking contact. A ratchet relay 191 includes a coil 195 which effects rotary movement of the wiper arm 194 an angular distance equal to that between finger openings each time the coil 195 is energized through the usual ratchet mechanism. At the hub of the disc 193 is a contact post 200. The disc 193 and the wiper arm 194 are insulated from each other at the common mounting axis.

Also included in the control system B are a three-pole single throw relay 114, a double throw single-pole ratchet relay 115, a tape cut-off knife control switch 116, a manual on and off switch 117, the feed solenoid 55, the motor 40, the switch blades 78, 79, and 78', 79', the circuit making and breaking cams 76 and 76' with their respective projections 77 and 77', and the necessary leads which interconnect the several elements and tap the power line.

The coil 195 of the ratchet relay 191 is connected by a lead 129 to line, and by a lead 131 to a movable switch arm of the ratchet relay 115 more particularly referred to below. Additionally, the contact post 200 is connected into the lead 129 by a lead 198, and the contact post 199 is connected by a lead 197 to one side of a coil 168 in the relay 114. The three-pole single throw relay 114 is of standard form and includes beside the coil 168, a movable conductive blade 169 and three poles or stationary contacts 170 and 171 and 172. As mentioned, the lead 197 connects one side of the coil 168 into the contact post 199; the other side of the coil 168 is connected by a lead 125 to line. A lead 132 connects the movable blade 169 with the lead 125 and leads 133, 134 and 135 are connected to the poles 170, 171 and 172, respectively.

The double throw single-pole ratchet relay 115 is of standard construction and includes a coil 175, one side of which is connected to the stationary contact of the on and off switch 117 by a lead 136, and the other side of which is connected by a lead 137 into the lead 129. Two stationary contacts 176 and 177 and a movable contact blade 178 are provided. The contact 176 is connected by a lead 147 to the switch blade 79' and the other contact 177 is connected by a lead 146 to the switch blade 79. A lead 147 connects the contact 78' to the 133, and a lead 148 connects the contact 78 to the lead 149. As mentioned above, the lead 131 is connected to the movable blade 178. The movable arm of the switch 117 is connected to the lead 133. As is manifest, the manual on and off switch 117 determines whether or not the ratchet relay 115 is in or out of the operating circuit. When in the operating circuit, the ratchet relay 115 changes polarity each cycle of relay operation to throw the blade 178 back and forth between the contacts 176 and 177, thereby determining which pair of the switch blades 78, 79 and 78', 79' is effective for the particular cycle. It is to be noted that the ratchet relay 115 is not employed in a particular machine 20 which uses a single cam 76 and one pair of switch blades 78 and 79 (Fig. 6).

The tape cut-off knife control switch 116 is automatically actuated by the knife linkage at the start of the cut-off action and includes a pair of contacts 180 and a bridge 181, the bridge normally being out of bridging engagement with the contacts 180. A lead 139 connects one contact 180 with the lead 125 and the other contact 180 is connected by the lead 135 to the lead 140 which is connected to one side of the motor 40. Hence, the motor 40 is energized at any time the bridge 181 closes the contacts 180, the motor circuit being completed by a lead 141 connecting the other side of the motor 40 to the lead 129.

The feed solenoid 55 has one side connected to the aforementioned lead 134, and the other side connected by a lead 138 to the lead 129.

Operation

When the machine 20 incorporating the electrical control system B is at rest, the selector dial 190 is in the position shown in Fig. 1, the knife blade 97 is spring raised to the position shown in Fig. 4, the solenoid 55 and the pressure wheel 75, together with the connecting parts, are in the positions shown in Figs. 2 and 8, the wiper arm 194 engages the circuit breaking notch 196 in the disc 193, the motor 40 is deenergized, the relays 191, 114 and 115 are deenergized, and the other elements of the present construction are similarly in non-operating positions.

Since the numbers visible through the openings 192 are divisible by 4, the pressure wheel 75 has a circumference of four inches inasmuch as a tape increment is determined by the circumference of this pressure wheel 75. For different length tape increments, it is but necessary to change the pressure wheel 75.

Assuming that a sixteen inch tape increment is desired, a finger, pencil, or the like, is inserted in the opening 192 through which the number 16 is visible, and the selector dial 190 is rotated clockwise until the finger or the like strikes the stop 189, whereupon, it and the connected disc 193 will be retained in this advanced position by a suitable spring loaded detent or ratchet (not shown). As the disc 193 is moved forwardly with the selector dial 190, the home position notch 196 will be moved forwardly from the end of the wiper arm 194 so that the wiper arm 194 comes into continuous circuit making contact with the disc 193. As the head of the wiper arm 194 leaves the notch 196 and engages the disc 193, a circuit is completed through the coil 168 of the relay 114, current flowing from line to lead 125, the coil 168, the lead 197, the contact post 199, the wiper arm 194, the disc 193, the contact post 200, the lead 198, and the lead 129 back to line. Energization of the coil 168 closes the movable blade 169 with the three poles 170, 171 and 172, whereupon both the motor 40 and the solenoid 55 are energized. Current reaches the motor 40 from line through the lead 125, the lead 132, the blade 169, the pole 172, the lead 135, the lead 140, the motor 40, the lead 141, and the lead 129 back to the other side of the line. Current flows to the solenoid 55 from line through the lead 125, the lead 132, the blade 169, the pole 171, the lead 134, the solenoid 55, the lead 138, the lead 129, and back to the other side of the line.

Energization of the motor 40 effects rotation of the feed wheel 48, and energization of the solenoid 55 effects a withdrawal of the plunger member 57 thereof against the force of the tension spring 61 to pivot the link 60 clockwise. Clockwise movement of the link 60, in turn, effects clockwise pivotal movement of the yoke 70 and the pressure wheel 75 rotatably supported thereby. Tape from the roll 29 has been previously fed across the feed wheel 48 by hand or in previous operations and cut off at the knife 97. The pressure wheel 75 is moved into contact with the tape, pressing it against the feed wheel 48. In the present illustration, the pressure wheel 75 will make four full revolutions in feeding sixteen inches of tape beyond the knife 97 and across the moistening brush 31.

The ratchet relay 191 is controlled by the switch blades 78, 79, or 78', 79', the active pair being determined by the position of the movable switch blade 178 of the ratchet relay 115. In the present illustration, it is assumed that the manual on and off switch 117 is open as shown in Fig. 12, and, hence, the switch blades 78 and 79 are active. The cam 76, through its projection 77, closes the switch blades 78 and 79 momentarily at the completion of each revolution of the pressure wheel 75. Hence, the coil 195 of the ratchet relay 191 will be energized momentarily at the end of each revolution of the pressure wheel 75 to move the wiper arm 194, in a clockwise direction, an angular distance equal to that between adjacent finger openings 192. The circuit for thus energizing the ratchet relay 191 is from line to the lead 125, the lead 132, the movable blade 169, the pole 170, the lead 133, the lead 149, the lead 148, the switch blades 78 and 79, the lead 146, the fixed contact 177, the movable blade 178, the lead 131, the coil 195, the lead 129 and back to the other side of the line.

In dispensing the example sixteen inch tape increment, the coil 195 will be momentarily energized four times, the last energization moving the wiper arm 194 into the home notch 196, whereupon, the relay 114 is opened, thereby deenergizing the motor 40 and the solenoid 55.

As the solenoid 55 is deenergized, the spring 61 moves the link counterclockwise back to the position shown in Fig. 2. Thereupon, the pressure wheel 75 is released from engagement with the tape, and hence, tape feeding stops. However, when the link 60 is in its lowered position, as aforesaid, the pawl 92 is biased by the spring 94 against the cam 89 so that the hook portion thereof engages the shouldered notch 91 of the cam 89. Hence, as the link 60 is returned to its position of Fig. 2, the pawl 92 will rotate the cam 89 a predetermined amount. The cam 89 is fixed to the eccentrically mounted roller 88 so that the clockwise rotation of the cam 89 effects the same rotation of the roller 88 which is thereby moved into engagement with the friction drive wheel 51 mounted on the major shaft element 46.

The coasting power of the motor 40 is adequate to pivot the ball crank lever 85 counterclockwise through engagement of the friction drive wheel 51 with the roller 88 to lower the pivotally mounted knife blade 97 to to sever the measured segment of tape. However, the switch 116 is provided to reenergize the motor 40 as the link 60 begins its return to rest travel. In its initial stage of movement, the bell crank lever 85 engages the switch 116 to close the bridge 181 across the contacts 180.

Energizing current follows a circuit from line through the lead 125, the lead 139, the closed switch 116, the lead 135, the lead 140, the motor 40, the lead 141, the lead 129, and back to the other side of the line. As the eccentrically mounted roller 88 completes its engagement with the friction drive wheel 51, it is stopped in the position shown in Figs. 9 and 10 by the spring-pressed ball detent 90, and the bell crank lever 85 is returned to the position shown in Figs. 2 and 8 against the stop 102 by the tension spring 100. As is clear from Fig. 9, the roller 88 is predeterminately cut away in order not to overdrive the bell crank lever 85 and the knife blade 97.

When the manually operated on and off switch 117 is closed, the ratchet relay 115 is connected into the general circuit. When the three-pole relay 114 is closed, as set forth above, current will flow through the coil 175 from line through the lead 125, the lead 132, the movable blade 169, the pole 170, the lead 133, the closed switch 117, the lead 136, the coil 175, the lead 137, the lead 129, and back to the other side of line. Hence, the coil 175 will be energized each time the selector dial 190 is operated to measure and dispense a tape increment. Each time the coil 175 is actuated, the ratchet relay 115 changes polarity, that is, the movable switch blade 178 is drawn from the stationary contact which it engages prior to energization of the coil 175 to engagement with the other stationary contact. For example, with the on and off switch 117 closed before the selector dial 190 is rotated to measure and dispense a tape increment (Fig. 12), upon closing of the relay 114 and energization of the coil 175 the movable contact 178 will be thrown into engagement with the stationary contact 176, thereby taking the switch blades 78 and 79 out of the active circuit, and throwing the switch blades 78' and 79' into the active circuit. The switch blades 78' and 79' will be momentarily closed by the projection 77' of the cam 76' after the pressure wheel 75 and the cam 76' have been rotated through one-half revolution, as is clear from the drawing. Hence, as long as the switch 117 remains closed, the machine 20 will dispense tape segments or increments of two inches, six inches, ten inches, etc., up to thirty-eight inches for the machine 20 illustrated, since the relay 115 will change polarity at each tape increment selection. Manifestly, the double cam construction shown in Figs. 11 and 12 must be employed for use of the ratchet relay 115 and the manual switch 117.

The applicant's dial control system for electrically actuated and controlled tape measuring and dispensing machines is fast and accurate. Thirty to forty inches of tape may be dispensed per second in a continuous measuring and feeding operation, the moistening of the tape being presently determinative of the speed. The tape must be adequately moistened or it will not stick to the applied package. Short tape increments may be rapidly and accurately dispensed, there being very little overrun, if any, in a particular dispensing operation, accuracy of increments being held to within a narrow margin less than one-quarter of an inch. Manifestly, the applicant has provided a control which fulfills the objects and advantages sought therefor.

It is to be understood that the foregoing description and the accompanying drawing have been given by way of illustration and example. It is also to be understood that changes in form of the elements, rearrangement of parts, and substitution of equivalent elements, which will be obvious to those skilled in the art, are contemplated as within the scope of the present invention which is limited only by the claims which follow.

What is claimed is:

1. In an automatic tape measuring and dispensing machine comprising tape feeding mechanism, tape measuring mechanism, and electrically powered means for actuating said tape feeding and measuring mechanisms: an electrical control system comprising a rotatable non-return dial for selecting a tape segment to be measured and dispensed, switch means connected with said dial for actuation thereby for effecting energization of said powered means to effect tape measuring and dispensing, and displaceable means connected to the tape measuring mechanism for effecting deenergization of said powered means as measuring of the selected tape segment is completed.

2. In an automatic tape measuring and dispensing machine comprising feeding means for feeding a tape strip and power means operatively connected to the feeding means for actuating the same: an electrical control system comprising a rotatable non-return dial for selecting a tape segment to be measured and dispensed, means connected with and actuated by said feeding means for measuring a tape strip as it is fed, means operatively connected to said dial and to said power means for effecting energization of the latter upon actuation of the former, and means for automatically rendering said power means inoperative to feed tape immediately upon completion of the feeding and measuring of the selected tape segment.

3. In an automatic tape measuring and dispensing machine comprising a rotatable feed member, power means operatively connected to said feed member for rotating the same, movable presser means for pressing a tape strip against said feed member for feeding the tape, and means for moving said presser means: an electrical control system comprising a rotatable non-return dial for selecting a tape segment to be measured and dispensed, actuating means connected with said dial and with both said power means and said presser moving means for actuating both of the latter upon movement of the former thereby to effect feeding of a tape strip, means actuated by said presser means for measuring tape as it is fed, and circuit breaking means responsive to movement of said tape measuring means for rendering said actuating means inoperative upon complete measurement of the selected tape segment thereby to stop the feeding of the tape strip.

4. In an automatic tape measuring and dispensing machine comprising a rotatable feed member, power means operatively connected to said feed member for rotating the same, movable presser means for pressing a tape strip against said feed member for feeding the tape, and means for moving said presser means: an electrical control system comprising a rotatable non-return dial for selecting a tape segment to be measured and dispensed, actuating means connected with said dial and with both said power means and said presser moving means for actuating both of the latter upon movement of the former thereby to effect feeding of a tape strip, means actuated by said presser means for measuring tape as it is fed, circuit breaking means responsive to movement of said tape measuring means for rendering said actuating means inoperative upon complete measurement of the selected tape segment thereby to stop the feeding of the tape strip, and selectively operable means connected with the aforementioned means actuated by said presser means for effecting the measurement and dispensation of a tape segment differing by a predetermined increment from that selected.

5. In a tape measuring and dispensing machine comprising a rotatable feed roller, a prime mover connected to the feed roller for rotating the same, a tape measuring and presser roller mounted for movement into and out of engagement with a tape strip interposed between the feed roller and the tape measuring and presser roller, and power means connected to the tape measuring and presser roller for moving the same into and out of the aforementioned engagement: an electrical control system comprising a rotatable non-return dial for selecting a tape segment to be measured and dispensed, cam means mounted for rotation with said tape measuring and presser roller adapted to indicate increments of measured and dispensed tape, means for energizing said prime mover and said power means upon actuation of said dial, and means for deenergizing said prime mover and said power means upon completion of measurement of a selected tape segment actuatable by said cam means.

6. In a tape measuring and dispensing machine comprising a supporting frame, a tape strip feed roller rotatably mounted thereon, a motor on said frame, means operatively connecting the motor and feed roller for drive of the latter by the former, a tape measuring and presser roller rotatably and swingably mounted on said frame, a solenoid, a linkage connecting the solenoid and the measuring and presser roller for swinging movement of the latter by the former to bring the measuring and presser roller into engagement with a tape strip interposed between the same and the feed roller, and a measuring cam rotatably mounted and connected to the measuring and presser roller for rotation therewith: an electrical control system for effecting sequential energization and deenergization of said motor and solenoid, said system including a rotatable non-return dial for selecting a tape segment to be measured and dispensed, means including an electrical conducting element responsive to movement of said dial for effecting energization of said motor and solenoid to effect tape measuring and feeding, and means including an electrical conducting element responsive to movement of said measuring cam for effecting deenergization of said motor and solenoid upon completion of tape measurement to stop tape feeding.

7. In a tape measuring and dispensing machine comprising a supporting frame, a tape strip feed roller rotatably mounted thereon, a motor on said frame, means operatively connecting the motor and feed roller for drive of the latter by the former, a tape measuring and presser roller rotatably and swingably mounted on said frame, a solenoid, a linkage connecting the solenoid and the measuring and presser roller for swinging movement of the latter by the former to bring the measuring and presser roller into engagement with a tape strip interposed between the same and the feed roller, and a measuring cam rotatably mounted and connected to the measuring and presser roller for rotation therewith: an electrical control system for effecting sequential energization and deenergization of said motor and solenoid, said system including tape segment selector means incorporating a non-return dial unit, motor and solenoid circuits adapted to be selectively energized upon actuation of said dial unit to effect measurement and dispensation of a tape strip, and a circuit actuatable by said measuring cam for automatically effecting deenergization of said motor and solenoid circuits upon completion of the measurement and dispensation of the selected tape segment.

8. An electrical control system for tape measuring and dispensing machines comprising a tape segement selector dial unit including a rotatably non-return dial, a plurality of angularly spaced stations for the dial, electrical conducting means connected to said dial for movement corresponding to the rotation of said dial, electrical contact means mounted for movement relative to said conducting means, said contact means and said conducting means being cooperatively adapted for non-engagement with each other when said system is at rest and being further cooperatively adapted for engagement with each other when said dial is rotated in the selection of a tape segment to be measured and dispensed, manually engageable means for rotating said dial in either direction, mechanical means for moving said contact means in a predetermined direction unaffected by the direction of movement of said conducting means, and electrically actuated switching means connected in series with said conducting and said contact means, said switching means including switch contacts for a motor circuit, switch contacts for a solenoid circuit, and switch contacts for a circuit adapted to control the aforementioned means for moving said contact means.

9. The combination of claim 8 with mechanically actuated switching means adapted for intermittent closure in accordance with the dispensation of predetermined increments of tape, said last-mentioned switching means being in said circuit adapted to control the means for moving said contact means.

10. The combination of claim 9 in which the mechanically actuated switching means comprises two separate switches adapted for alternate operation, and selectively operable means for incorporating first one and then the other of said two separate switches in the circuit adapted to control the means for moving said contact means, said selectively operable means being selectively adapted to function upon each closure of said electrically actuated switching means.

11. An electrical control system for tape measuring and dispensing machines comprising a tape segment selector dial unit including a one-way rotatable dial, a plurality of angularly spaced stations, indicating numerals therefor, and a stop member, a contact disc mechanically connected to said dial for rotation therewith having a notch in the periphery, said disc being insulated from said dial, a contact arm rotatably mounted on the same axis as said dial and disc but insulated therefrom and unconnected therewith, said arm including a portion disposed in said disc notch out of engagement with said disc when said system is at rest and being positioned for engagement with said disc when said disc is rotated in the selection of a tape segment to be measured and dispensed, a coil mechanically connected to said arm for rotating it in the direction of movement of said dial and disc in annular increments corresponding to the angular distance between stations of the dial unit, a three-pole single throw relay including a coil and three contacts, said last-mentioned coil being connected in a circuit with said arm and said disc, one of said three contacts being in a motor circuit, another of said contacts being in a solenoid circuit, the third of said three contacts being in a circuit with said arm actuating coil, a rotatable measuring wheel cam, and a switch mechanically closed and released by said cam at the completion of each revolution thereof, said switch being in said circuit with said third contact and arm actuating coil.

12. The combination of claim 11 with a second switch mechanically closed and released by said cam at the completion of one-half revolution thereof and thereafter at the completion of each whole revolution thereof, said two switches being interchangeable in said circuit with said third contact and arm actuating coil, and a rachet relay operated double throw switch for interchanging said two switches as aforesaid.

References Cited in the file of this patent

UNITED STATES PATENTS

| | | |
|---|---|---|
| 1,732,635 | Chabot | Oct. 22, 1929 |
| 1,960,945 | Krueger | May 29, 1934 |
| 1,981,229 | Gillet | Nov. 20, 1934 |
| 2,190,832 | Elliot | Feb. 20, 1940 |
| 2,258,912 | Steen et al. | Oct. 14, 1941 |
| 2,408,363 | Beckman | Oct. 1, 1946 |
| 2,413,137 | Dederick | Dec. 24, 1946 |
| 2,417,593 | Farrow | Mar. 18, 1947 |
| 2,468,772 | Mungall | May 3, 1949 |